US007683519B2

(12) United States Patent
Finkenbinder et al.

(10) Patent No.: US 7,683,519 B2
(45) Date of Patent: Mar. 23, 2010

(54) CURVILINEAR BRUSH RETAINER WITH LINER FOR AN ELECTRIC MOTOR ASSEMBLY

(75) Inventors: David B. Finkenbinder, Ravenna, OH (US); Robert A. Ciccarelli, Kent, OH (US)

(73) Assignee: Ametek, Inc., Paoli, PA (US)

( * ) Notice: Subject to any disclaimer, the term of this patent is extended or adjusted under 35 U.S.C. 154(b) by 0 days.

(21) Appl. No.: 12/253,357

(22) Filed: Oct. 17, 2008

(65) Prior Publication Data

US 2009/0121581 A1 May 14, 2009

Related U.S. Application Data

(63) Continuation-in-part of application No. 11/983,844, filed on Nov. 13, 2007, now abandoned.

(51) Int. Cl.
*H02K 39/00* (2006.01)

(52) U.S. Cl. ....................................... 310/239; 310/245

(58) Field of Classification Search ................. 310/239, 310/242, 245–248, 251
See application file for complete search history.

(56) References Cited

U.S. PATENT DOCUMENTS

| | | | | |
|---|---|---|---|---|
| 3,145,316 | A * | 8/1964 | Page | 310/246 |
| 5,434,463 | A | 7/1995 | Horski | 310/248 |
| 6,703,754 | B1 | 3/2004 | Finkenbinder et al. | 310/227 |
| 6,800,981 | B2 * | 10/2004 | Kuhlmann-Wilsdorf | 310/239 |
| 2006/0226730 | A1 | 10/2006 | Fulton | 310/239 |

* cited by examiner

*Primary Examiner*—Dang D Le
(74) *Attorney, Agent, or Firm*—Renner Kenner Greive Bobak Taylor & Weber

(57) ABSTRACT

A curvilinear brush retainer and brushes for an electric motor assembly provides an end plate upon which is disposed a pair of curvilinear brush retainers. The brush retainers are configured to retain and support a pair of curvilinear brushes as they are biased against the commutator of the electric motor along a curvilinear path. Brush liners are disposed within the curvilinear path maintained by the brush retainers, serving to reduce the stiction or frictional force imparted to the brushes as they move, thereby reducing the temperature of the brush and extending their operating life.

11 Claims, 15 Drawing Sheets

CURVILINEAR BRUSH RETAINER WITH LINER FOR AN ELECTRIC MOTOR ASSEMBLY

CROSS-REFERENCE TO RELATED APPLICATION

The instant application is a continuation-in-part of U.S. patent application Ser. No. 11/983,844 filed on Nov. 13, 2007, now abandoned the contents of which are incorporated herein by reference.

TECHNICAL FIELD

The present invention is generally directed to electric motor assemblies. In particular, the present invention is directed to an electric motor assembly that utilizes molded curvilinear brushes so as to increase the length of the brushes. More particularly, the present invention is directed to an electric motor assembly that provides curvilinear brush retainers for aligning the curvilinear brushes with a commutator of the electric motor. Specifically, the present invention is directed to an electric motor assembly that includes curvilinear brush retainers that maintain corresponding curvilinear brush liners therein.

BACKGROUND ART

Electric motors, such as DC (direct current) electric motors utilize carbon brushes in order to supply electrical current to a commutator that is rotatably carried by an armature of the motor. In the past, brushes have been formed to have a rectilinear or straight shape or profile, which has been generally adopted throughout the industry, and as a result are utilized in most DC electric motors.

Due to the design of DC or AC electric motors, the brushes are in continuous physical contact with the commutator during the operation of the motor. In addition, due to the switching of the electrical currents supplied by the brushes to the commutator, an amount of electrical sparking/arcing is generated. Thus, the combination of the physical and electrical stress imparted to the brushes during operation of the motor creates an operating environment that typically causes the brushes to wear out well before the failure of the other components of the motor. As such, brush failure serves as one of the primary sources of failure in DC motors. Although the brushes may be replaced, allowing the motor to continue in service, such an endeavor is tedious, time consuming, and costly.

To overcome the problem of reduced electric motor operating life due to brush wear, attempts have been made to extend the physical length of the brush so that the brushes can operate for a longer period of time. However, electric motors are generally incorporated into an existing assembly of electromechanical components that have been previously designed to have only enough area to accommodate motors that utilize standard brush lengths. Although, the physical arrangement of the electromechanical components surrounding the motor may be revised to accommodate longer length brushes, other design constraints associated with the overall assembly forming the completed device may also be impacted. Thus, a redesign of a significant portion of the completed product or device may be required to accommodate longer length rectilinear brushes.

Furthermore, as curvilinear brushes wear during the operation of the motor unit, the brushes move within corresponding brush retainers, and as such, they are subject to stiction (static friction) or frictional forces that develop between the surfaces of the brush and the surfaces of the brush retainer upon which the brush is carried or guided. As such, stiction or frictional forces that resist the movement of the brush within the brush retainer cause the brush to stutter or skip as it moves toward the commutator as the brush wears during the operation of the motor unit. The stuttering and skipping that is imparted to the movement of the brush results in additional electrical sparking and/or arcing at the interface between the brush and the commutator. Unfortunately, however such sparking and/or arcing exacerbates the wear of the brushes, and thus prematurely reduces their operating life.

Therefore, there is a need for a brush retainer liner that reduces or eliminates the stiction or frictional forces between the brush and the surfaces of the brush retainer that contact the brush as it wears. In addition, there is a need for a curvilinear brush liner for a curvilinear brush retainer that reduces stiction or frictional forces about one or more surfaces of the brush that contacts the brush retainer.

SUMMARY OF THE INVENTION

In light of the foregoing, it is a first aspect of the present invention to provide a curvilinear brush retainer with liner for an electric motor assembly.

It is another aspect of the present invention to provide a brush liner to slidably receive a brush within a curvilinear brush retainer of a motor assembly end plate comprising a wall guide, a base guide extending at a substantially right angle from one edge of the wall guide, a retaining guide extending at a substantially right angle from a second edge of the wall guide that is opposite the base guide, and a stop section extending from the second edge, the stop section configured to engage the brush retainer to prevent the movement of the brush liner, wherein the wall guide, the base guide, and the retaining guide are configured to be received by the curvilinear brush retainer, such that the brush is permitted to move within the brush retainer.

Still another aspect of the present invention is to provide an end plate for an electric motor having a shaft extending from a commutator, the end plate comprising a mounting portion having a first surface opposite a second surface, the mounting portion having an opening through which the shaft passes, a pair of curvilinear brush retainers disposed on the first surface, the retainers extending from the opening, so as to define a curvilinear path, a brush liner disposed within the curvilinear path of each the brush retainer, and a pair of curvilinear brushes received by the brush liner and guided by each the curvilinear path toward the commutator.

BRIEF DESCRIPTION OF THE DRAWINGS

These and other features and advantages of the present invention will become better understood with regard to the following description, appended claims, and accompanying drawings where:

BEST MODE FOR CARRYING OUT THE INVENTION

Figure 1:
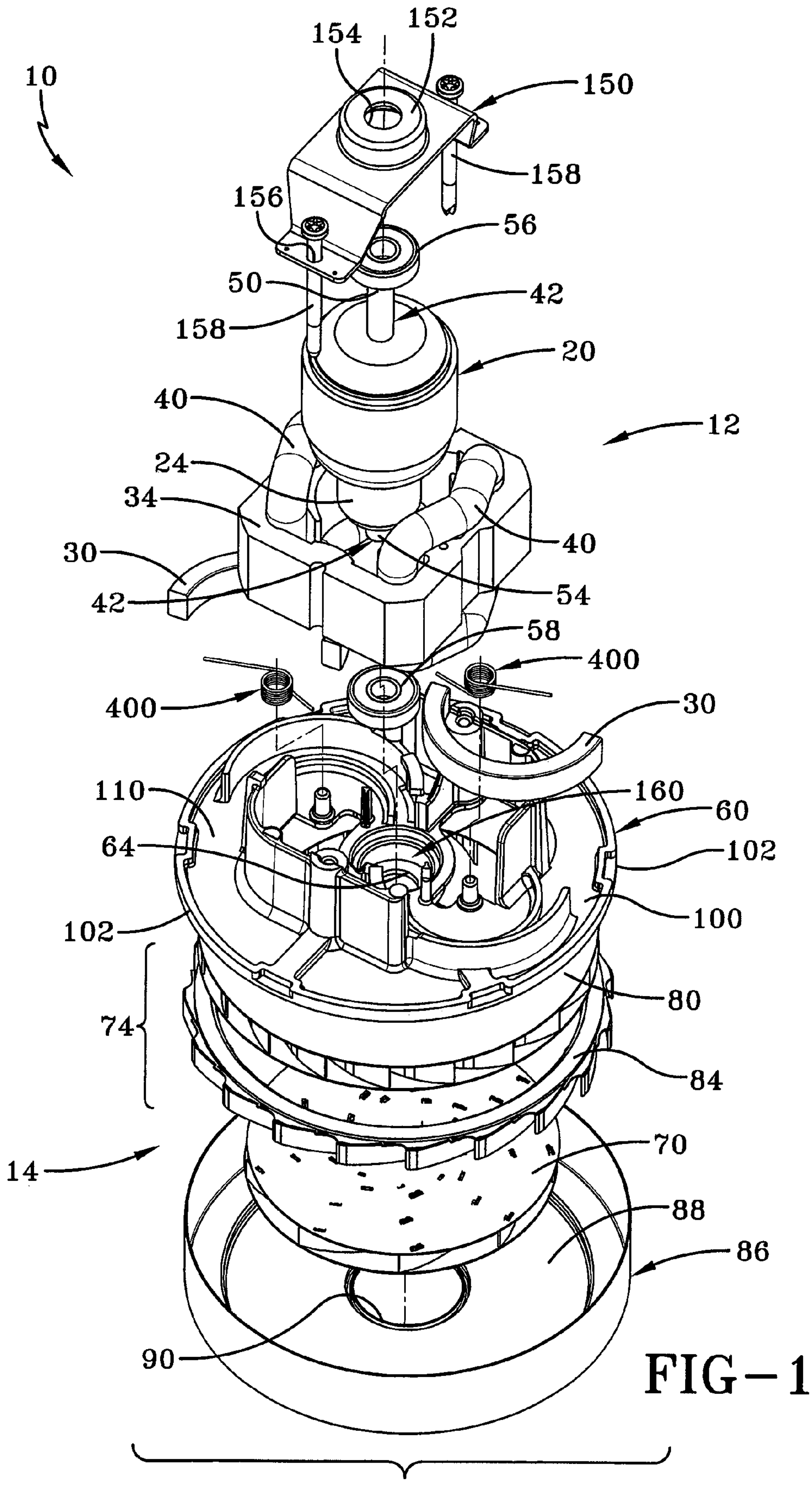
FIG. 1 is an exploded perspective view of an electric motor unit that comprises a motor assembly and a fan assembly in accordance with the concepts of the present invention.

An electric motor unit, indicated generally by the numeral 10, and as shown in FIG. 1, generally includes a DC (direct current) motor assembly 12 and a fan assembly 14. The motor assembly 12 comprises an armature 20 that carries a commutator 24, which is configured to receive electrical current from a pair of curvilinear brushes 30. The armature 20 is rotatably disposed within a fixed lamination stack 34, which also contains various field windings 40. The armature 20 is carried by a shaft 42 that is rotatably supported at each end 50 and 54 by respective bearings 56 and 58. Although a DC motor assembly is shown, it will be appreciated that the concepts disclosed are applicable for use with AC motor assemblies.

During operation of the motor assembly 12, electrical current is supplied to the commutator 24 via the brushes 30, thereby allowing the armature 20 to rotate within the lamination stack 34 so as to provide a driving force to the end 54 of the shaft 42, which is proximate the fan assembly 14. The motor assembly 12 is supported by an end plate 60 attached to the end of the motor assembly 12 that is proximate the commutator 24, whereby the end plate 60 maintains a central aperture 64 through which the end 54 of the shaft 42 passes. Although the following discussion relates to the use of the end plate 60 with the fan assembly 14, it should be appreciated that the end plate 60 may be utilized independently, and as such may be used in conjunction with any assembly in which the driving force from the shaft 42 is needed.

Figure 2:
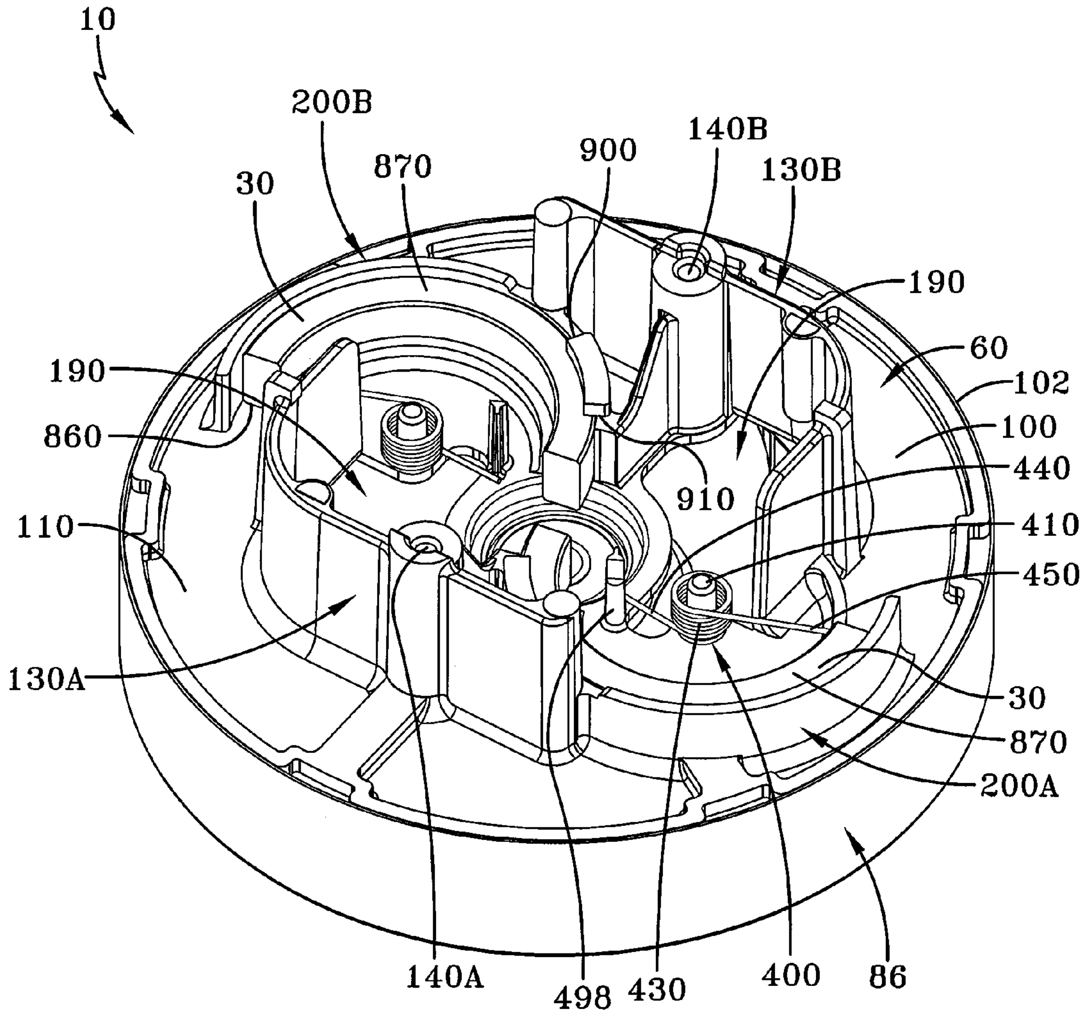
FIG. 2 is a perspective view of the fan assembly with the motor assembly removed and, in particular, an end plate having a curvilinear pair of brushes retained within a curvilinear brush retainer, the end plate is also shown with a shroud attached thereto in accordance with the concepts of the present invention.

With regard to FIGS. 1 and 2, the fan assembly 14 comprises a fan 70 coupled to the end 54 of the motor shaft 42 via any suitable fastener (not shown), such as a nut for example. Interposed between the fan 70 and the end plate 60 is a diffuser assembly 74 that comprises a primary diffuser plate 80 and a secondary diffuser plate 84. As will be appreciated by the skilled artisan, the diffuser plates are configured to efficiently move air through the motor assembly. Although not shown, it will be appreciated that the diffuser plates and shroud could be configured as a radial or tangential bypass blower configuration. The diffuser assembly 74 is attached to the end plate 60 and, as such, remains in a fixed position with respect to the fan 70. Covering the outside of the fan assembly 14 is a shroud 86 that is connected to the end plate 60 using any suitable means, such as friction fit or staking for example. The shroud 86 includes a cover portion 88 that has a centrally disposed intake port 90 that is coaxially arranged with the axis of the shaft 42 of the motor assembly 12. The intake port 90 allows the fan assembly 14 to draw air into the shroud 86 where it is pressurized or otherwise compressed, and then supplied to the diffuser assembly 74 where it is exhausted into the inner portion of the shroud 86 and directed toward the motor assembly 12.

The end plate 60, which is the primary basis for the discussion that follows, is defined by a planar plate portion 100 having an edge 102. Although, shown as a planar portion in the Figs., it should be appreciated that the plate portion 100 may comprise any desired shape. Furthermore, the end plate 60 may be formed from any suitable material, such as plastic, or other polymeric material. In one aspect, the end plate 60 may be formed from thermoset polyester or, in another aspect, the end plate 60 may be formed using an "open and shut" molding process, although any other suitable manufacturing technique may be utilized in the formation of the end plate 60. Although a DC motor assembly is shown, it will be appreciated that the concepts disclosed are applicable for use with AC motor assemblies.

Continuing, the planar plate portion 100 includes an attachment surface 110 that is opposite an inlet surface 120. Extending substantially perpendicularly from the attachment surface 110 are a pair of motor brackets 130A and 130B that provide respective mounting bores 140A and 140B. The motor brackets 130A and 130B are spaced apart by a suitable distance to accommodate the dimension of the motor assembly 12 that is attached thereto.

The motor assembly 12 is attached to the motor brackets 130A and 130B by a retaining bracket 150 shown in FIG. 1. The retaining bracket 150 comprises a bearing retainer 152 having a central aperture 154 that is configured to be coaxial with the armature shaft 42. In addition, the bearing retainer 152 is configured to retain the bearing 56 therewithin so as to allow the end 50 of the shaft 42 to pass through, thus providing rotating support to the end 50 of the armature 20. The retaining bracket 150 also contains a plurality of retaining apertures 156 on either side of the bearing retainer 152, which are configured to align with the mounting bores 140A and 140B provided by the end plate 60. Suitable fasteners 158, such as screws, are disposed through the retaining apertures 156 and received by the mounting bores 140A and 140B so as to retain the motor assembly 12 to the end plate 60.

Disposed within the central region of the attachment surface 110 of the end plate 60 and extending therethrough is a central aperture 64 that is sized to allow the end 54 of the motor shaft 42 to extend therethrough for coupling to the fan assembly 14. As shown in FIGS. 3-10, the end plate 60 includes a commutator receiver 160, shown more clearly in FIGS. 9 and 10, which provides suitable clearance for the rotation of the motor shaft 42, while also retaining the bearing 58. Specifically, the commutator receiver 160 may extend axially outward from the inlet surface 120 of the end plate 60 to define a well 170. The well 170 includes a plurality of stepped concentric recesses 180 and 182 that accommodate the profile of both the commutator 24 and the bearing 58 received therein. Specifically, recess 180 is configured to retain the bearing 58 used to rotatably support the end 54 of the armature shaft 42, whereas the recess 182 provides clearance for the commutator 24.

To allow cooling air to pass over the armature 20 and the brushes 30, the end plate includes a pair of cavities 190 that are disposed through the planar plate portion 100 of the end plate 60 in a region between the motor mounts 130A-B and the commutator receiver 160. Thus, when the motor assembly 12 is attached to the end plate 60, air drawn into the shroud 86 by the fan 70 is exhausted through the cavities 190 and flows over the armature 20 and brushes 30.

In order to maintain the brushes 30 in electrical contact with the commutator 24 during operation of the motor assembly 12, a pair of curvilinear brush retainers 200A and 200B are provided upon the attachment surface 110 of the end plate 60. Because the curvilinear brush retainers 200A and 200B are substantially equivalent in structure, with one being a mirror image of the other, the following discussion is directed to that of only brush retainer 200A.

As shown in the Figs., particularly FIGS. 2-4 and 6-8, the brush retainer 200A is curvilinear in shape and is comprised primarily of four members: an inner member 210, an outer member 220, a support member 230, and a retention member 240. The members 210-230 coact to form an arcuate or otherwise curvilinear path through which the brush 30 is received and able to readily slide or sweep, allowing the brush 30 to continuously remain in contact with the commutator 24. The brush retainers 200 are integrally formed and extend from the plate portion 100. As such, separate brush holder tubes do not need to be maintained or secured to end plate 60 for the purpose of carrying the brush.

Figure 4:
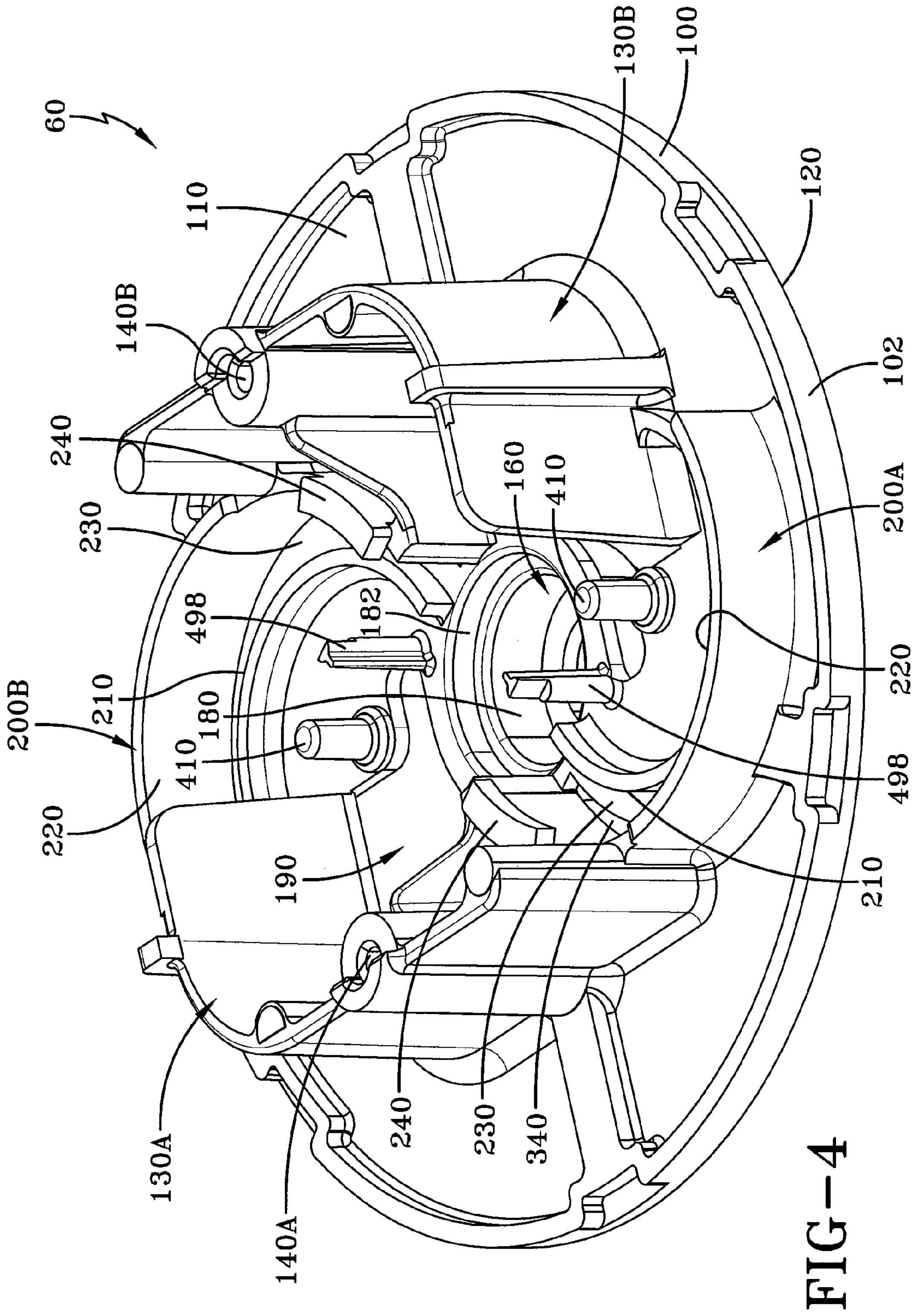
FIG. 4 is another perspective view of the end plate without an attached shroud showing components of the curvilinear brush retainers in accordance with the concepts of the present invention.
Figure 4A:
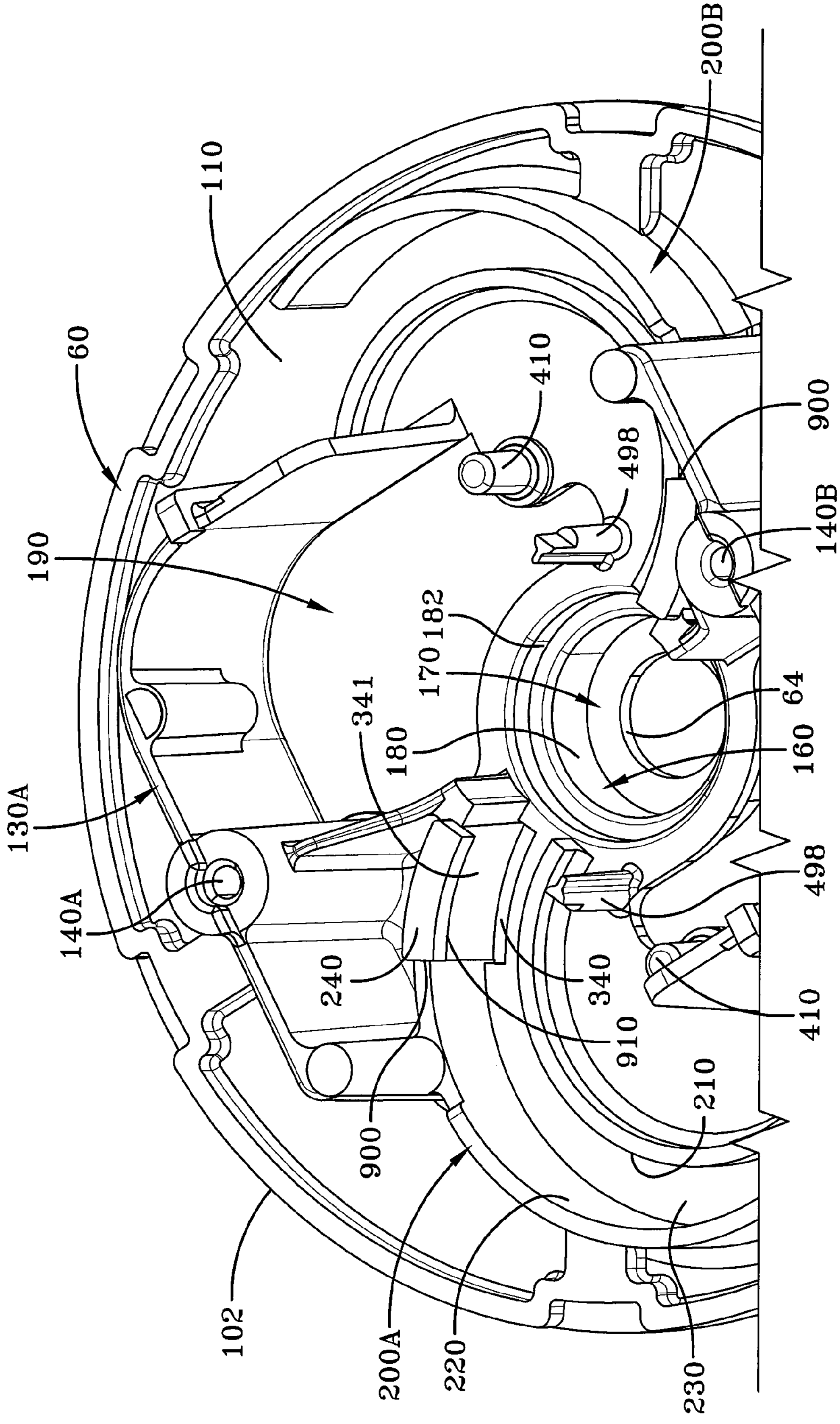
FIG. 4A is another perspective view of the end plate showing a slot associated with the brush retainers.
Figure 4B:
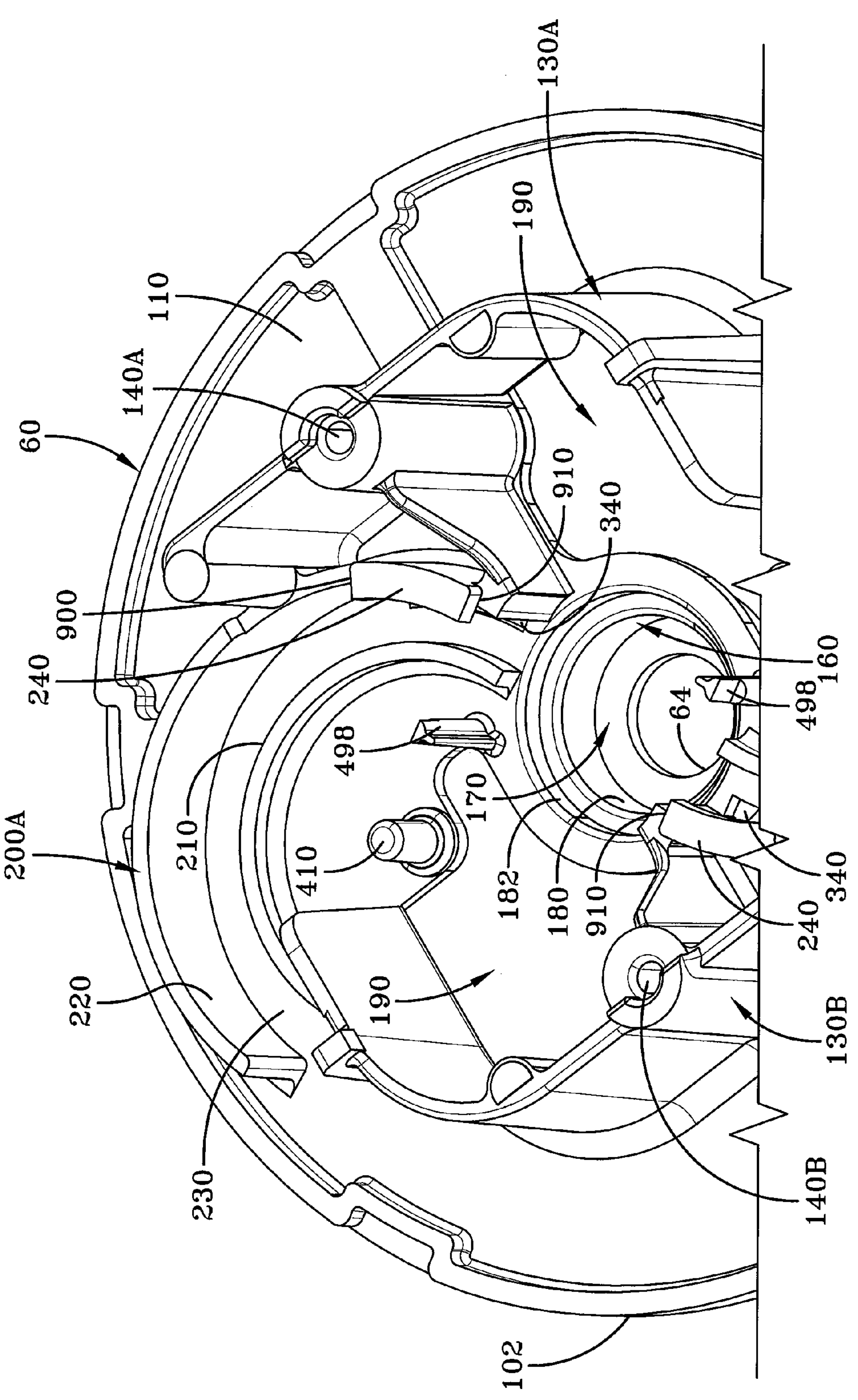
FIG. 4B is another perspective view of the end plate in accordance with the concepts of the present invention.
Figure 5:
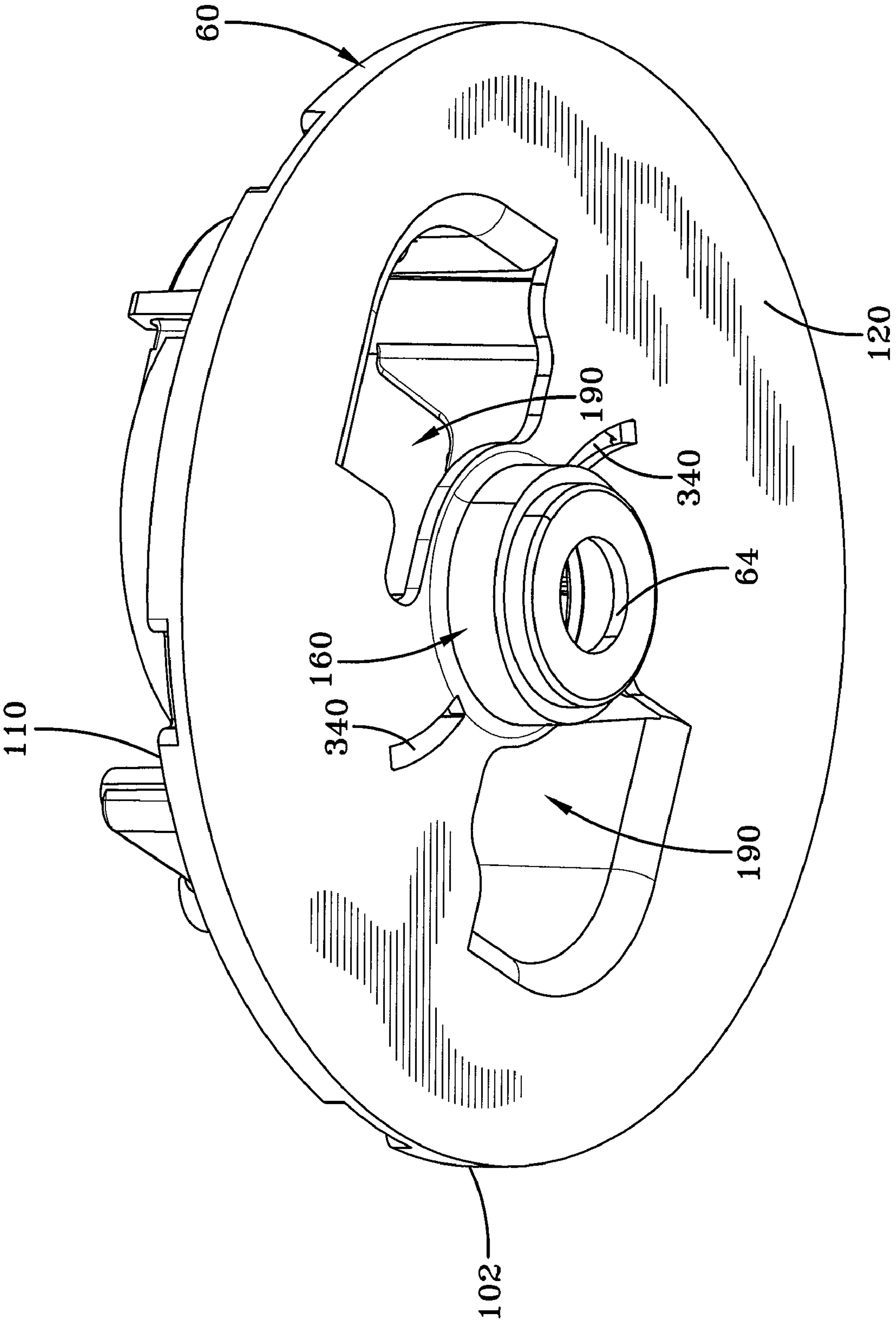
FIG. 5 is a perspective view of an inlet end of the end plate in accordance with the concepts of the present invention.
Figure 6:
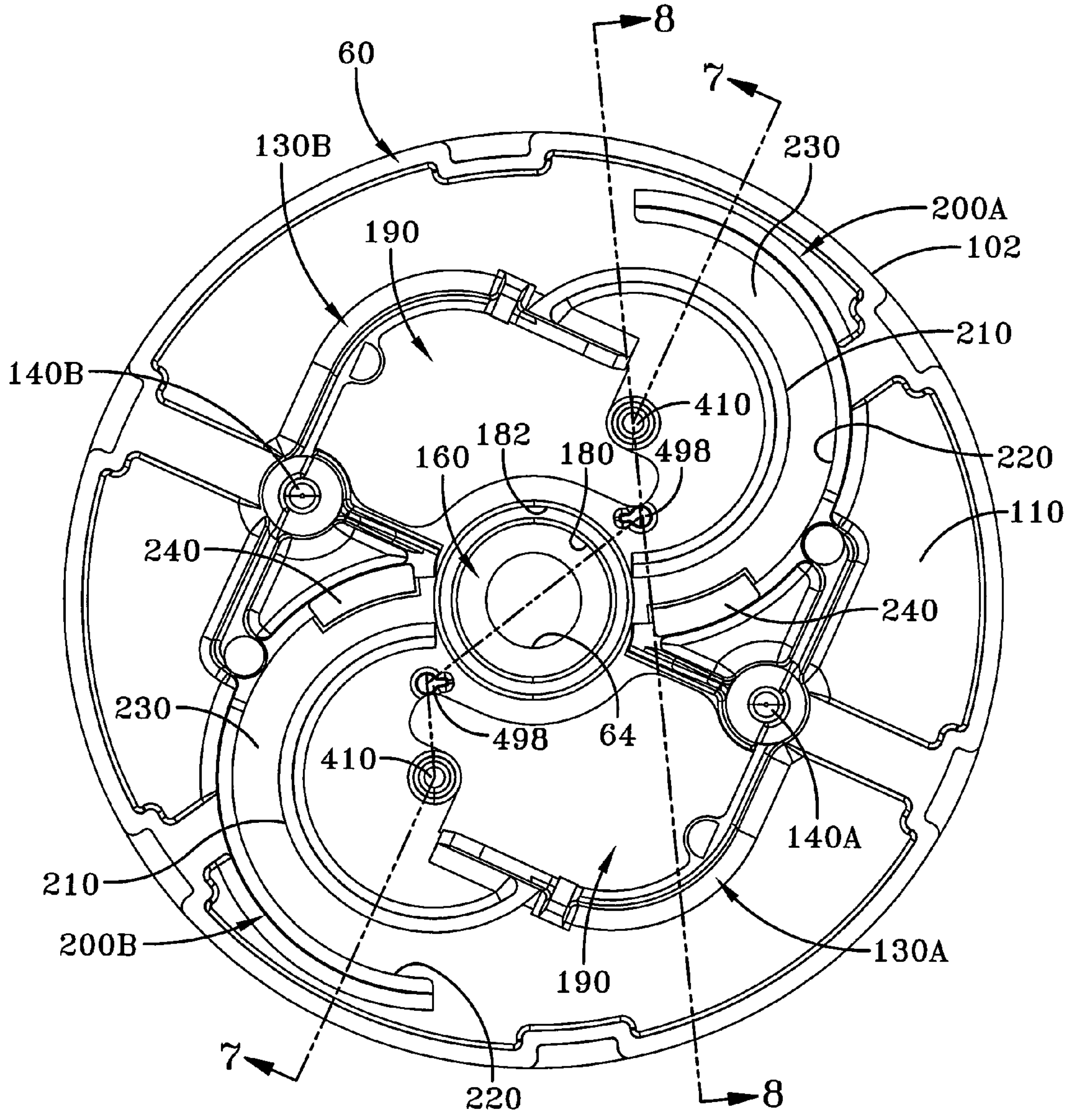
FIG. 6 is a plan view of the end plate without the curvilinear brushes in accordance with the concepts of the present invention.
Figure 8:
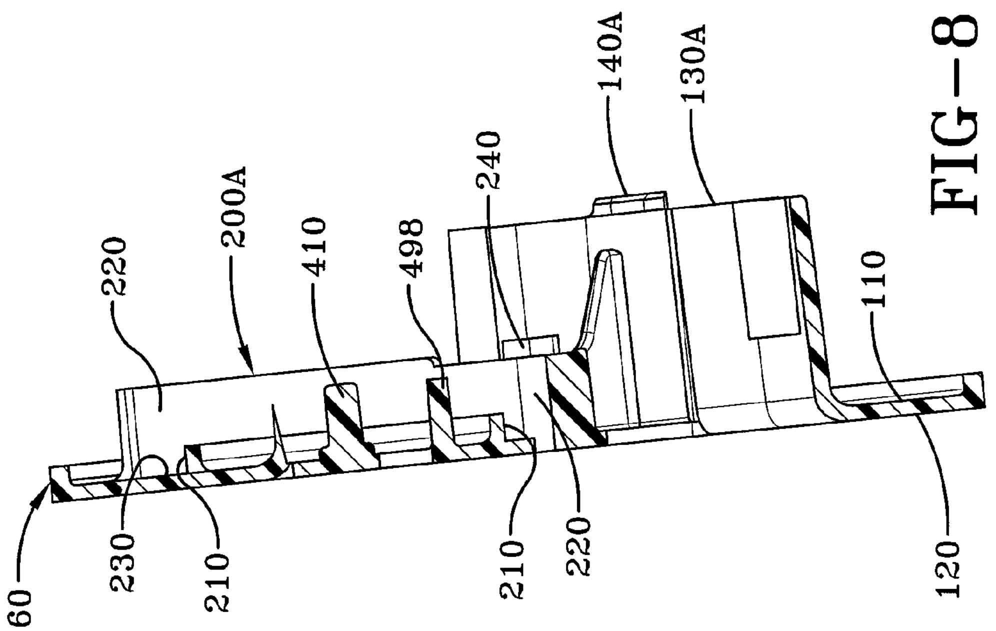
FIG. 8 is a cross-sectional view of the end plate taken along line 8-8 of FIG. 6 in accordance with the concepts of the present invention.
Figure 7:
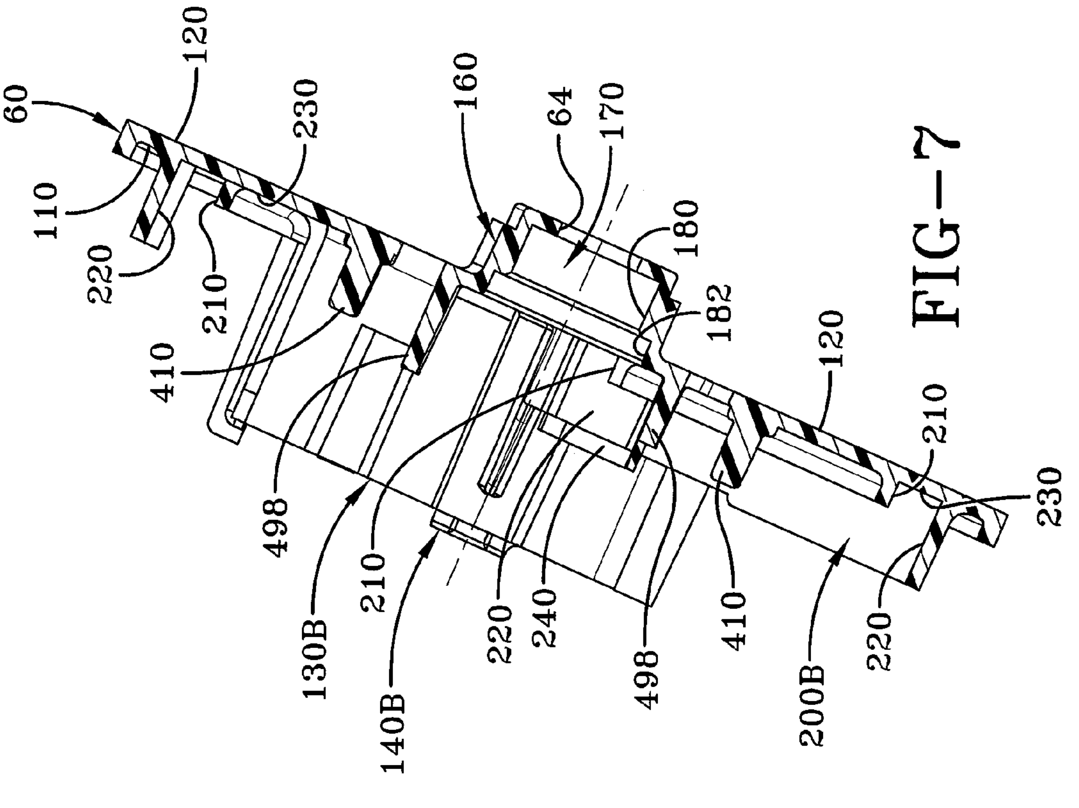
FIG. 7 is a cross-sectional view of the end plate taken along line 7-7 of FIG. 6 in accordance with the concepts of the present invention.
Figure 9:
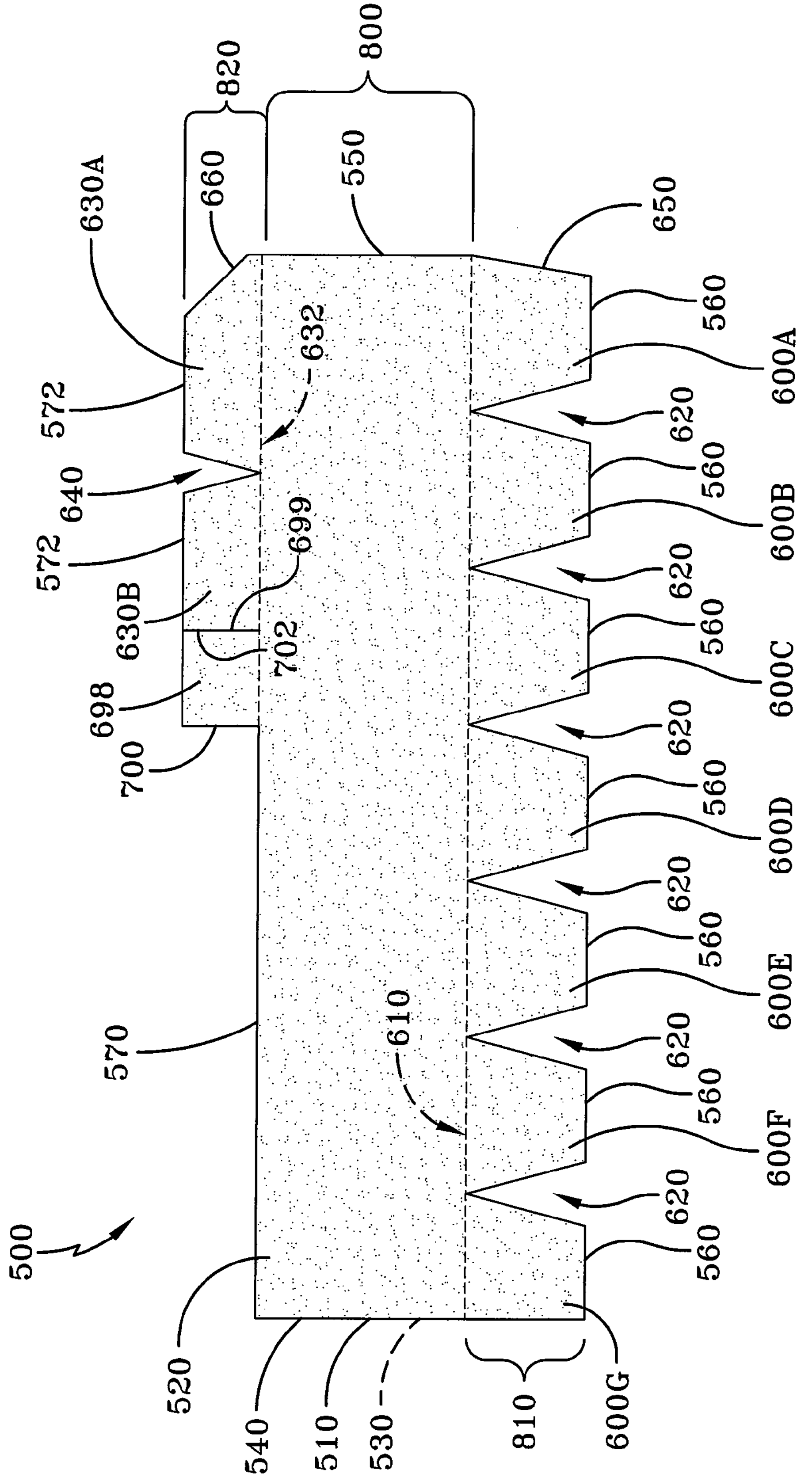
FIG. 9 is an elevational view of a brush liner for receipt within the curvilinear brush retainer in accordance with the concepts of the present invention.
Figure 10:
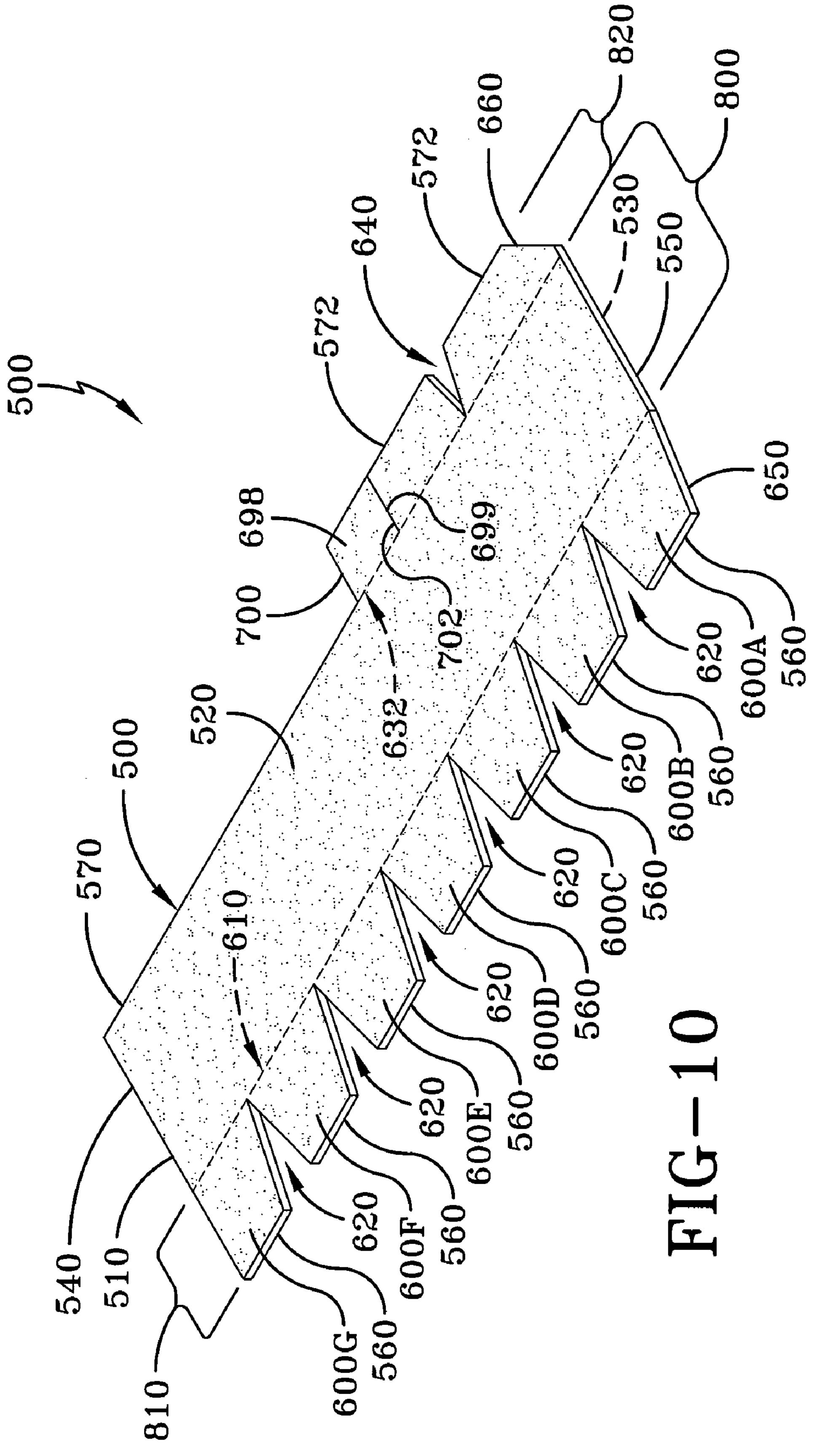
FIG. 10 is a perspective view of the brush liner in accordance with the concepts of the present invention.
Figure 11:
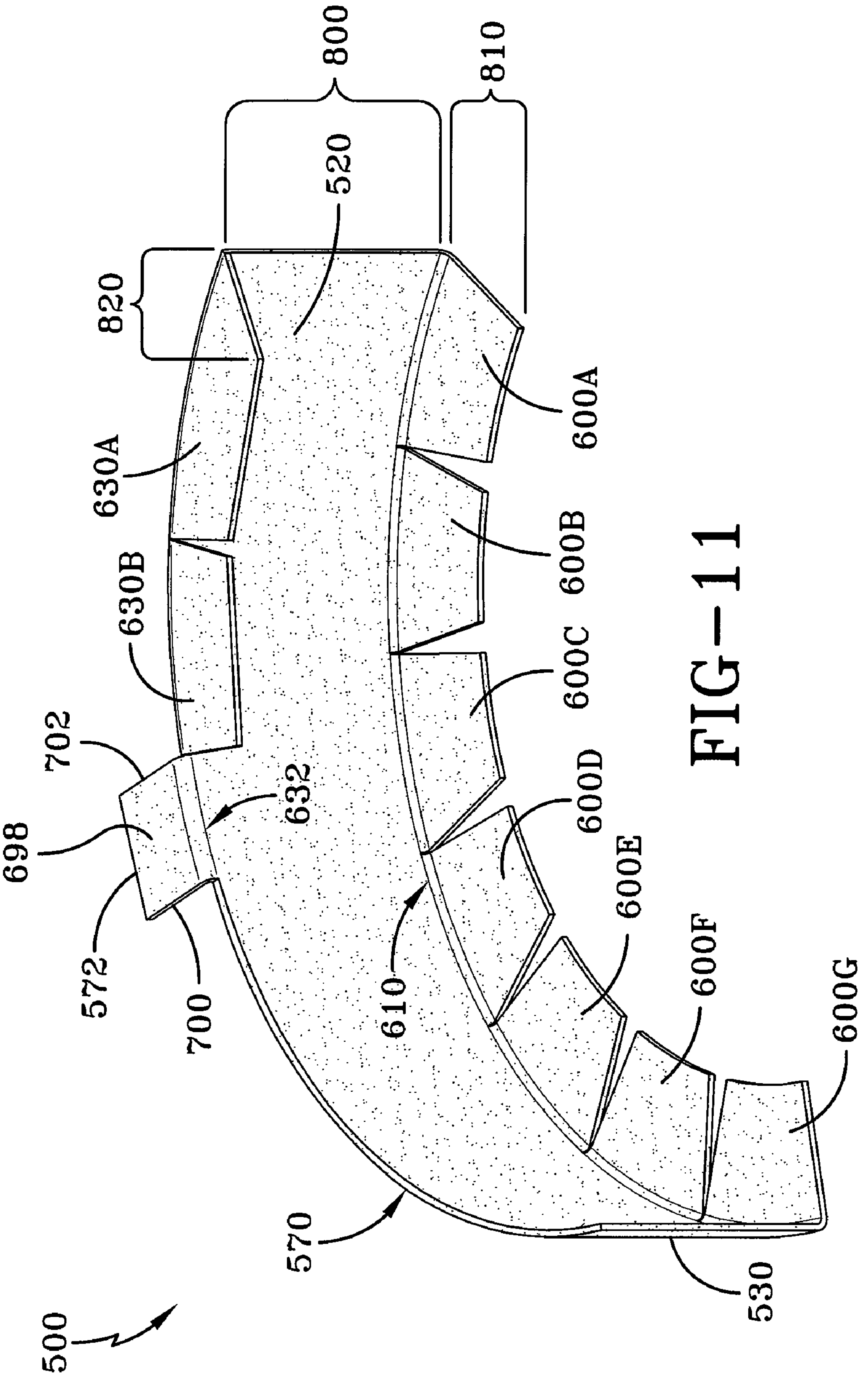
FIG. 11 is a perspective view of the brush liner when configured for placement within the curvilinear brush retainer in accordance with the concepts of the present invention.
Figure 12:
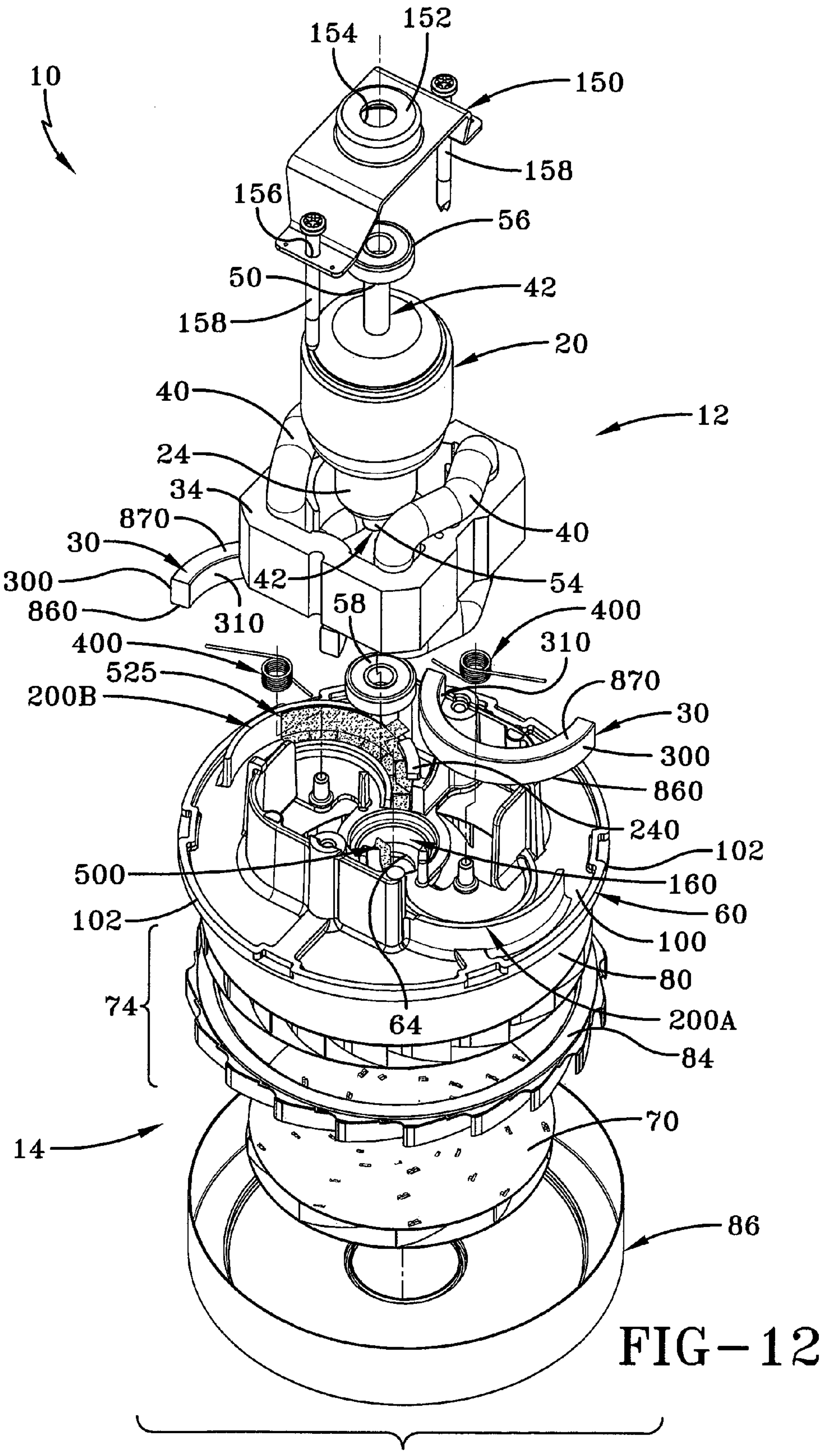
FIG. 12 is an exploded perspective view of the electric motor unit that comprises the motor assembly and the fan assembly, which includes the end plate that maintains the brush retainers and associated brush liners in accordance with the concepts of the present invention.
Figure 13:
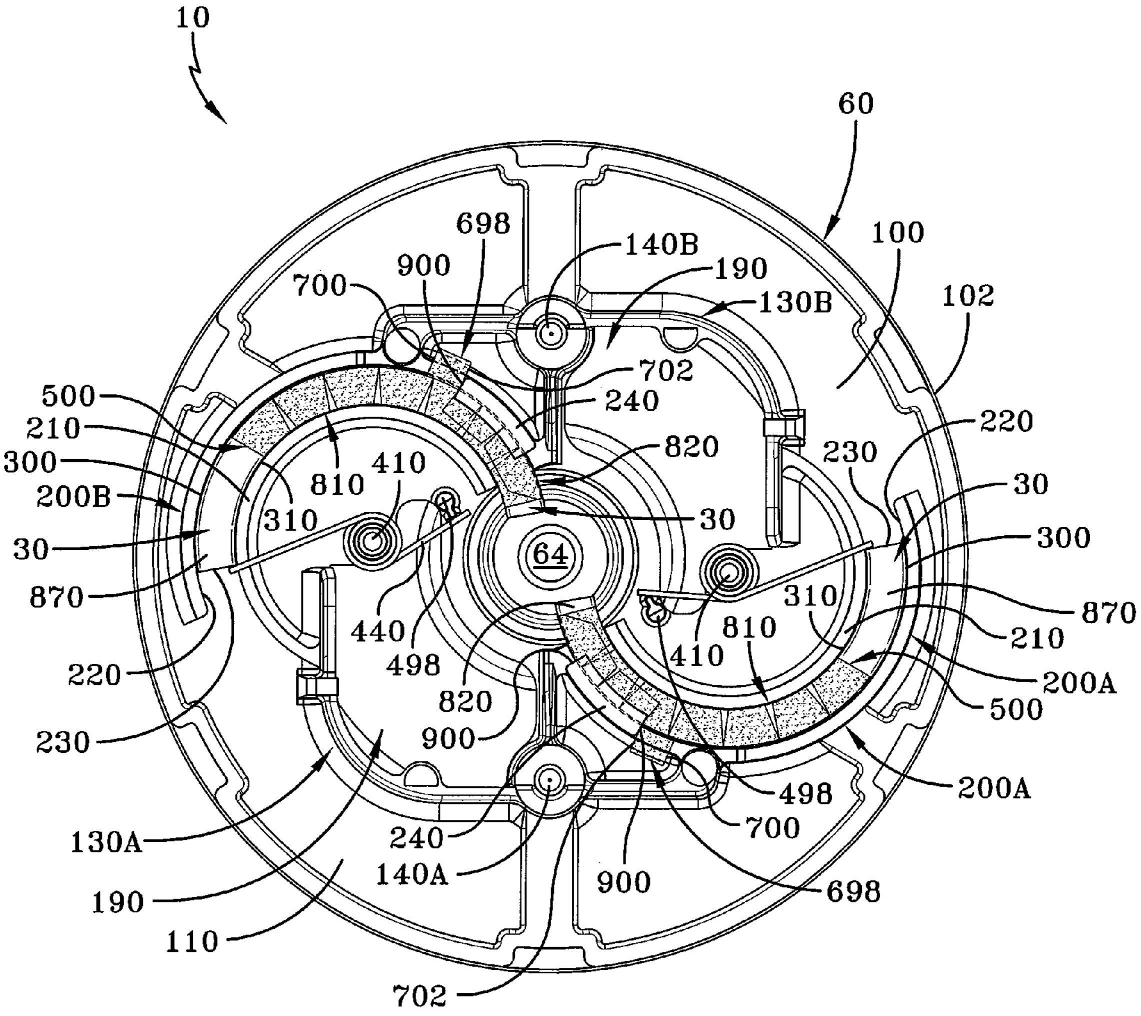
FIG. 13 is a top plan view of the inlet end of the end plate showing the brush liners disposed within corresponding curvilinear brush retainers in accordance with the concepts of the present invention.
Figure 14:
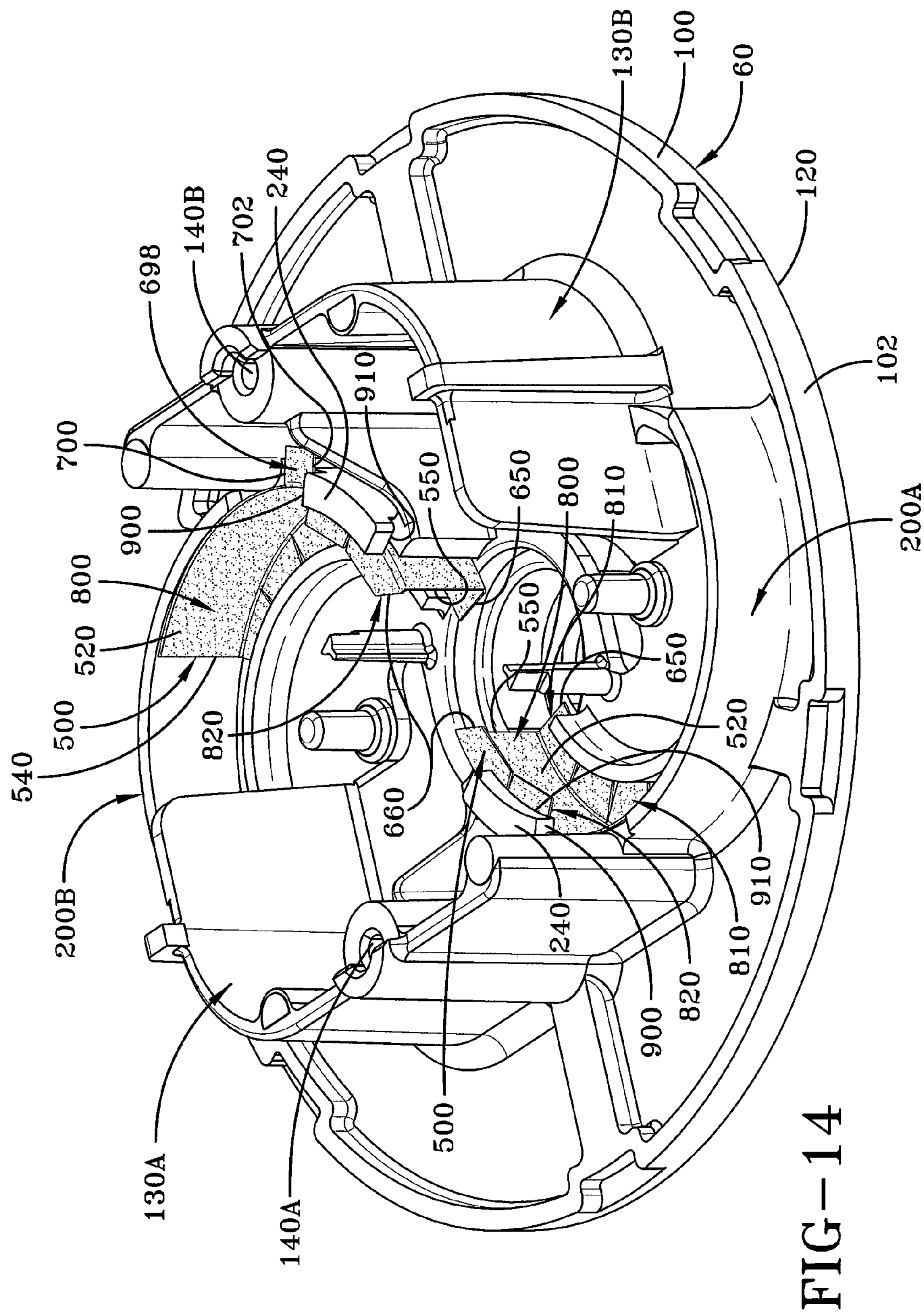
FIG. 14 is a perspective view of the end plate showing the brush liners disposed within corresponding curvilinear brush retainers in accordance with the concepts of the present invention.

As shown in FIGS. 4A and 4B, the inner member 210 and the outer member 220 extend axially outward and substantially perpendicularly from the attachment surface 110 of the end plate 60 toward the motor assembly 12. Additionally, the inner member 210 and the outer member 220 are substantially concentric with each other, and are spaced apart by the support member 230 so as to define a curvilinear path that matches the curvature of the curvilinear brush 30. However, it should be appreciated that the concentric relationship between the inner and outer members 210,220 is not required.

Figure 3:
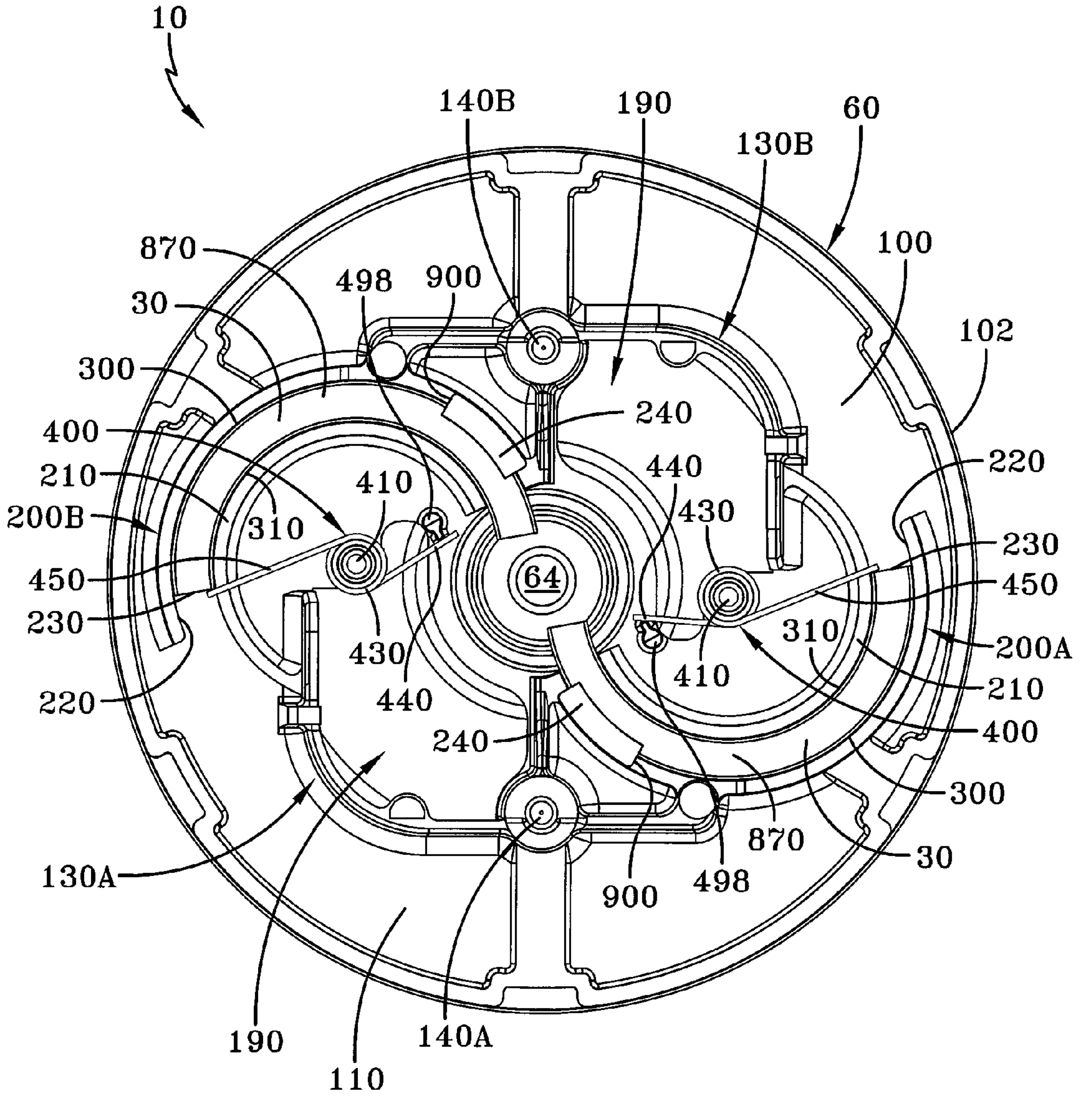
FIG. 3 is a plan view of an attachment end of the end plate showing the curvilinear brushes in accordance with the concepts of the present invention.

The curvilinear brushes 30, as shown in FIGS. 1-3, are typically comprised of electrically conductive carbon material that is formed to have a curvilinear shape. The curvilinear shape may be formed from a molding process or other suitable technique. The curvilinear profile or shape of the brushes 30 allow them to have an increased length dimension over that of standard rectilinear brushes, without extending beyond the edge 102 of the end plate 60. Such a characteristic of the curvilinear brushes 30 allows the operating life of the motor unit 10 to be extended without consuming additional area in and about the region of the end plate 60. In other words, because the brush retainers 200A and 200B, as well as the brushes 30 do not extend beyond the edge 102 of the end plate 60, the end plate 60 can be utilized in devices where the component area about the motor 12 is constrained, while providing increased operational life to the motor unit 10. Furthermore, the end plate 60 may be configured such that it can accommodate the curvilinear brush retainers 200A and 200B while the end plate is able to maintain a dimension that is the same as end plates that are used to maintain rectilinear brush retainers used for rectilinear brushes.

The outer members 220 and the inner members 210 are dimensioned to extend from the attachment surface 110 of the end plate 60 a distance to provide suitable support to respective outer and inner surfaces 300 and 310 of the brush 30. Because the brush 30 is primarily being guided by the inner member 210, it is not required to extend the full height of the brush 30. In one aspect, the inner member 210 may extend from the end plate 60 by comparatively less than the outer member 220 extends. As such, the path formed by the outer and inner members 220,210 and the support member 230, which extends between the members 210 and 220, extends in a curvilinear manner from a region within the boundary of the planar plate portion 100 to a region proximate the commutator receiver 160.

In the region of the brush retainer 200A proximate the commutator receiver 160, the retention member 240 extends from the outer member 220 toward the inner member 210 substantially perpendicularly, while simultaneously following the curvature of the outer member 220. It should be appreciated that the retention member 240 may span only a partial amount of the distance between the outer and inner members 220,210. Furthermore, the retention member 240 may be configured so that it extends only a partial length of the outer member 220. As such, the retention member 240 is dimensioned primarily to prevent the brush from sliding upwardly out of the brush retainer 200A. Likewise, the outer member 220 functions to counteract the force applied by the spring, as will be discussed, so as to retain the brush. Extending through the support member 230 and proximate the commutator receiver 160 is an open slot 340, shown clearly in FIG. 4A. The slot 340 is provided to allow any fragments or particles from the brush 30 to exit the end plate 60 so that they do not accumulate, while also allowing cooling air from the fan assembly 14 to pass therethrough to cool the brushes 30. In the embodiment shown, the slot 340 is proximal the outer member 220. However, in other embodiments, an appropriately sized slot could extend anywhere through the support member 230. It is believed, however, that by placing the slot 340 proximal the member 220, an indentation 341 can be formed therein so as to allow more airflow over the surface of the brush.

Turning to FIGS. 2 and 3, in order to maintain continuous contact between the brush 30 and the commutator 24, a torsion spring 400 and associated spring holder 410 are utilized. The spring holder 410 extends substantially perpendicularly from the attachment surface 110 of the end plate 60 and is located at a point that is approximately the center of the radius of curvature of the curvilinear inner and outer members 210, 220. However, it should be appreciated that the spring holder 410 may be located at any desired point with respect to the inner and outer members 210,220. Continuing, the bias or torsion spring 400 comprises a coil 430, from which extends a retaining leg 440 and a bias leg 450. Specifically, an inner diameter of the coil 430 of the spring 400 is dimensioned so as to receive the spring holder 410 therewithin. The retaining leg 440 is held in position by a leg retainer 498 that extends at a substantially right angle from the attachment surface 110 of the end plate 60. Thus, when the spring 400 is placed into use, a torsional force is imparted to the bias leg 450. The bias leg 450 is positioned behind a rear end surface of the brush 30, thereby urging a front end of the brush into continuous electrical contact with the commutator 24. It should be appreciated that the coil 430 may require "winding" or otherwise be preloaded to allow the coil 430 to impart sufficient force to both the retaining leg 440 and biasing leg 450.

It should be appreciated that because the spring holder 410 is located at the center of the path formed by the concentrically arranged inner and outer members 210, 220 in which the brush 30 slides, the bias leg 450 is able to apply force to the same region of the brush 30 as it wears. In other words, as the material comprising the brush 30 is consumed and the brush slides toward the commutator 24, the bias leg 450 applies force in approximately the same location on the brush 30. As such, the amount of force that is applied to the brush 30 by the spring 400 throughout the operating life of the brush 30 is essentially consistent. As such, the amount of sparking that occurs between the commutator 24 and the brush 30 is reduced, thus further extending the life of the brush 30.

By configuring the brush retainers 200A-B as described above, and as seen in FIGS. 7 and 8, it will be appreciated that a substantial portion of the retained brush is exposed. As a result, air is allowed to flow around the brush so as to maintain the brush at a reduced temperature. Indeed, only two of the brush surfaces—the bottom and the outer curved surface—are covered, while virtually all of the top surface of the brush and most of the inner curved surface are exposed. This configuration also helps to facilitate installation of the brushes in as much as the top and side openings of the retainer enable easy insertion of the brush into the retainer.

In yet another embodiment, as shown in FIGS. 9-14, brush liners 500 may be respectively received within each of the brush retainers 200A-B. In particular, the brush liner 500 is formed from any suitable friction reducing material, such as polytetrafluoroethylene (PTFE), also sold under the brand TEFLON®. The brush liner 500, as shown clearly in FIGS. 9-11, comprises a body 510 having any suitable thickness, and which maintains a guide surface 520 opposite a positioning surface 530 that is bounded by opposed end edges 540 and 550, and by opposed base and top edges 560 and 570. A top section edge 572 extends from a portion of top edge 570 adjacent end edge 550. Disposed along the base edge 560 and between the end edges 540,550 are a plurality of angled base relief sections 600A-G that extend to a base fold edge 610. The base relief sections 600 are separated by a plurality of relief cut-outs or voids 620 that also extend from the base fold edge 610. Specifically, the relief sections 600A-G extend from the base fold edge 610 in a tapered manner. A top fold edge 632 delineates the top section edge 572 from the top edge 570. Indeed, the edge 632 is co-linear with the tope edge 570.

Disposed along the top section edge 572 and proximate to the end edge 550 is a pair of angled top relief sections 630A-B that extend from the top fold edge 632, which are separated by a relief cut-out or void 640. In particular, the relief sections 600A and 630A may have respective tapered edges 650 and 660 that are proximate the end edge 550. Furthermore, the top relief sections 630A-B extend from the top fold edge 632 in a tapered manner. In addition, the top section edge 572 also maintains a stop section 698 that is separated from the relief section 630B by a slit 699 that extends from the top fold edge 632. As such, the stop section 698 is bounded by the top section edge 572, and by a transition edge 700 that is opposite a stop edge 702, whereby the transition edge 700 is proximate the end edge 540 of the brush liner 500 and the stop edge 702 is proximate the end edge 550 of brush liner 500. Furthermore, the top edge 570 of the brush liner 500 extends between the transition edge 700 maintained by the stop section 698 and the end edge 540 of the brush liner 500, such that the transition edge 700 serves to offset the top edge 570 and the top section edge 572. It should be appreciated that the top fold edge 632 and the top edge 570 are coextensive with one another, and that the top fold edge 632 and the top edge 570 are substantially parallel with that of the base fold edge 610. The tapered profile of the relief sections 600A-G and 630A-B facilitate the ability of the brush liners 500 to take on a curved or contoured shape that matches or substantially matches the curved or contoured shape of the brush retainers 200A-B.

The brush retainers 500 are configured such that the base fold edge 610 and the top fold edge 630 are spaced apart at a distance that is substantially equal to the height of the outer member 220 of the brush retainers 200A-B so as to form a wall guide 800. Whereas, the region between the base fold edge 610 and the base edge 560 that includes the relief sections 630A-G forms a base guide 810, and the region between the top fold edge 632 and the top section edge 572 that includes the relief sections 630A-B forms a retaining guide 820.

Thus, the relief sections 600A-G and 630A-B along with respective relief cut-outs or voids 620 and 640 permit the guide surface 520 of the wall guide 800, the base guide 810 and the retaining guide 820 to be curved or otherwise contoured in a manner for receipt within the curvilinear path defined by the brush retainer 200A-B in a manner to be discussed. That is, the relief sections 600A-G and 630A-B and associated relief cut-outs or voids 620,630 allow the wall guide 800, the base guide 810, and the retaining guide 820 of the brush liner 500 to be suitably curved to respectively match the curvature of the outer surface 300, the curvature of a bottom surface 860 of the brush, and the curvature of a top surface 870 of the brush 30 disposed within the brush retainers 200A-B. Furthermore, the relief sections 600A-G and 630A-B and the cutouts or voids 620,640 prevent the brush liner 500 from puckering, buckling, or deforming during the operation of the unit 10.

To utilize the brush liner 500 with the brush retainers 200A-B provided by the end plate 60, the retention members 600A-G disposed along the base edge 560 and the retention members 630A-B disposed along the top section edge 572 are folded or otherwise bent so that they perpendicularly extend from respective base fold edge 610 and the top fold edge 632. Upon folding the brush liner 500 as indicated, the guide surface 520 maintained by the base guide 810, and the retaining guide 820 are substantially parallel to one another and spaced apart by the wall guide 800. As such, the brush liner 500 is oriented for receipt within the brush retainers 200A-B, such that the positioning surface 530 of the base guide 810 is disposed against or adjacent the support member 230, the positioning surface 530 of the wall guide 800 is disposed against or adjacent the outer member 220, and the positioning surface 530 of the retaining guide 820 is disposed against or adjacent a bottom surface 910 of the retention member 240. As such, the brush liners 500 are inserted within the brush retainers 200A-B, such that the brush liner 500 is oriented so that the stop edge 702 of the stop section 698 is disposed against a rear edge 900 of the retention member 240.

Once inserted within the brush retainers 200A-B, the guide surface 520 maintained by the wall, base, and retaining guides 800,810,820 serves as a surface upon which the brush 30 is able to freely translate or move thereupon, with minimal or no stiction or frictional forces imparted to the brush 30 and the guide surface 520. That is, as the torsion spring 400 urges the brush 30 toward the commutator 24, the outer surface 300, the bottom surface 860, and the top surface 870 of the brush 30 engages the respective wall guide 800, base guide 810, and retaining guide 820 of the brush liner 500. To prevent the brush liner 500 from being carried or otherwise moved toward the commutator 24 or into the commutator receiver 160 of the end plate 60, the stop section 698 is positioned so that the stop edge 702 perpendicularly extends from the top edge 570 of the body 510, but in a direction that is opposite that of the retaining guide 820. In other words, the retaining guide 820 and the stop section 698 extend from the top edge 570 of the body 510 at a substantially right angle, but in opposite directions. As such, the stop edge 702 of the stop section 698 is enabled to engage or otherwise rest against the rear edge 900 of the retention member 240 to prevent the brush liner 500 from being moved as the brush 30 is slid or moved upon the brush liner 500 by the force applied thereto by the torsion spring 400.

Thus, the brush liner 500 allows the brush 30 to move or translate within the brush retainers 200A-B with minimal or no stiction, or frictional force, which would otherwise be present. The reduction in stiction or frictional force prevents the brushes 30 from stuttering as it moves during its wear, which reduces the amount of sparking and/or arcing that tends to occur at the interface between the brushes 30 and the commutator 24. And, thus, contributes to a reduction in their operating temperature, thereby extending the operating life of the brushes 30.

Therefore, one advantage of the present invention is that a brush liner may be disposed within a curvilinear brush retainer so as to enhance the ability of a brush to move within the brush retainer as it wears with reduced stiction or friction. Another advantage of the present invention is that the reduction of stiction or friction in the movement of the brushes reduces the development of sparking and arcing between the brushes and the commutator thus increasing the operational life of the brushes.

Thus, it can be seen that the objects of the invention have been satisfied by the structure and presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A brush liner to slidably receive a brush within a curvilinear brush retainer of a motor assembly end plate comprising:

a wall guide;

a base guide extending at a substantially right angle from one edge of said wall guide;

a retaining guide extending at a substantially right angle from a second edge of said wall guide that is opposite said base guide; and a stop section extending from said second edge, said stop section configured to engage the brush retainer to prevent the movement of the brush liner;

wherein said wall guide, said base guide, and said retaining guide are configured to be received by the curvilinear brush retainer, such that the brush is permitted to move within the brush retainer.

2. The brush liner of claim 1, wherein said base guide comprises a plurality of tapered base relief sections.

3. The brush liner of claim 2, wherein said retaining guide comprises a plurality of tapered top relief sections.

4. The brush liner of claim 1, wherein said wall guide, said base guide, said retaining guide, and said stop section are formed from polytetrafluoroethylene (PTFE).

5. An end plate for an electric motor having a shaft extending from a commutator, said end plate comprising:

a mounting portion having a first surface opposite a second surface, said mounting portion having an opening through which the shaft passes;

a pair of curvilinear brush retainers disposed on said first surface, said retainers extending from said opening, so as to define a curvilinear path;

a brush liner disposed within said curvilinear path of each said brush retainer, wherein said brush liner comprises a stop section to engage said brush retainer to prevent movement of said brush liner; and a pair of curvilinear brushes received by said brush liner and guided by each said curvilinear path toward the commutator.

6. The end plate of claim 5, wherein said brush liner is formed from polytetrafluoroethylene (PTFE).

7. The end plate of claim 5, wherein said brush liner comprises a body comprising:

a wall guide;

a base guide extending substantially perpendicularly from one edge of said wall guide;

a retaining guide extending substantially perpendicularly from a second edge of said wall guide that is opposite said base guide; and said stop section extending from said second edge, said stop section configured to engage said brush retainer to prevent said body from moving toward the shaft, wherein said wall guide, said base guide, and said retaining guide are received by said brush retainer so as to guide the brush along said curvilinear path.

8. The end plate of claim 7, wherein each said curvilinear brush retainer comprises:

a curvilinear outer member, and a curvilinear inner member that are spaced from each other, and which extend axially from said opening, so as to define said curvilinear path adjacent the commutator.

9. The end plate of claim 8, wherein said wall guide is disposed against said curvilinear outer member.

10. The end plate of claim 9, wherein each said curvilinear brush retainer further comprises:

a retention member extending traversely from said curvilinear outer member and toward said inner member.

11. The end plate of claim 10, wherein said stop section engages said retention member.

* * * * *